No. 739,443. Patented September 22, 1903.

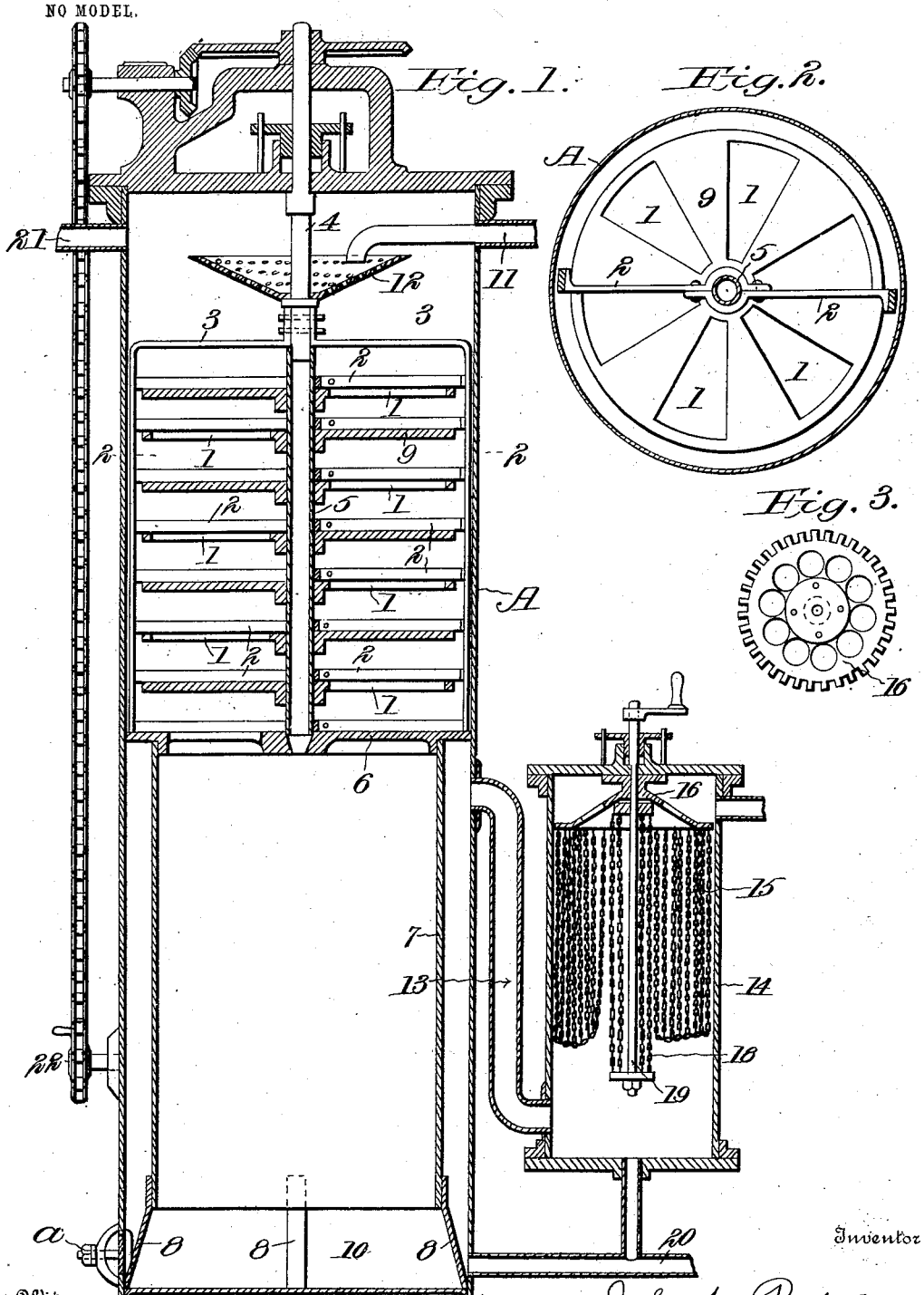

UNITED STATES PATENT OFFICE.

JOHN WILHELM PERTZ, OF ELWOOD, INDIANA.

FEED-WATER HEATER AND PURIFIER.

SPECIFICATION forming part of Letters Patent No. 739,443, dated September 22, 1903.

Application filed June 17, 1903. Serial No. 161,852. (No model.)

*To all whom it may concern:*

Be it known that I, JOHN WILHELM PERTZ, a citizen of the United States, residing at Elwood, in the county of Madison and State of Indiana, have invented new and useful Improvements in Feed-Water Heaters and Purifiers, of which the following is a specification.

This invention relates particularly to feed-water heaters and purifiers for steam-boilers; and a primary object of the invention is to produce an apparatus in which the parts which receive the incrustation can be cleaned while the apparatus is in operation.

A further object is to heat the feed-water by steam by means of an improved steam-chamber, through which the water flows.

A further object is to produce an improved construction of filter or purifier comprising a number of chains or similar flexible metallic bodies so hung that they may be moved and rubbed against each other while in operation to remove any incrustation thereon.

With these and other objects in view the invention is illustrated in the accompanying drawings, in which—

Figure 1 is a vertical section of the apparatus. Fig. 2 is a horizontal section on the line 2 2 of Fig. 1, and Fig. 3 is a plan of the chain-holder.

Referring specifically to the drawings, A indicates a cylindrical chamber closed by suitable heads at top and bottom and having at the top thereof a water-inlet 11 and steam-inlet 21. The upper portion of the cylinder contains a vertical series of perforated pans or plates 9, the perforations being preferably of the form shown at 1 in Fig. 2. These pans are fixed at suitable distances apart upon a central tubular post or support 5 and are so arranged that the openings 1 are staggered in the respective pans, whereby the water falls on every pan and is consequently thoroughly heated by the steam entering at 21. The water first falls from the pipe 11 upon a perforated bowl 12, which is attached to a shaft 4, stepped in the upper end of the post 5. This shaft carries outwardly and downwardly extending arms 3, to which the scrapers 2 are attached. These scrapers lie upon the pans and when rotated cleanse the same from sediment or incrustation, which drops through the openings 1 into the space 10 at the bottom of the cylinder A. The lower portion of the cylinder A contains the cylindrical tank or settling-chamber 7, which stands upon legs 8 and supports the lowest plate or pan 6, which has perforations similar to those in the pans 9 to admit the flow of water into the cylinder 7. This pan also supports the post 5 and is extended at its outer edges to cover and close the annular space between the cylinder 7 and outer cylinder 8, so that the course of the water from the pans is down through the settling-cylinder 7 and up through the annular space to the connecting-pipe 13 and the filter, to be hereinafter described.

To rotate the shaft 4 and the scrapers, a hand-crank 22 is used, connected by suitable gearing to the shaft. At *a a* hand-hole is indicated, through which the chamber A may be cleaned, if desired.

The pipe 13 leads to the lower end of a secondary purifier or filter comprising a cylindrical vessel 14, closed at top and bottom and having therein a chain-holder or spider 16, from which hang the chains 15, and also a central vertical shaft 19, which extends through a gland in the top head and carries within the chamber the chains 18. Blow-off pipes 20 lead from the bottom of both casings.

In operation the water entering from the pipe 11 is heated by the steam from the pipe 21 and deposits its sediment or sludge, or a part thereof, upon the pans 9 or in the bottom of the casing. At desired or necessary intervals the scrapers are rotated to remove the incrustation from the pans and drop it to the chamber below. The water passes from the vessel A through pipe 13 into the cylinder 14 and up through the filtering-chains 15 and 18, upon which any remaining impurities are deposited as incrustation. At desired or necessary intervals the shaft 19 is turned, which has the effect of rubbing or brushing the chains together, whereby the sediment is removed and falls to the bottom of the cylinder. The sediment in either or both cylinders may be blown out through the pipes 20.

It will be seen that the pans or chains which receive the incrustation or sediment may be cleaned while the apparatus is working, and the pan and scraper construction and the hanging chains provide a purifier which may be readily cleaned.

What I claim as new, and desire to secure by Letters Patent, is—

1. In a feed-water heater and purifier, the combination with a steam-casing, of a series of perforated pans therein, through which the water flows, and movable scrapers upon the pans.

2. In a feed-water heater and purifier, the combination with a steam-casing, of a series of perforated pans therein, through which the water flows, movable scrapers upon the pans, and means extending outside the casing to operate the scrapers.

3. In a feed-water heater and purifier, the combination with a steam-casing, of a series of relatively rotatable plates and scrapers therefor, within the casing, and means extending outside the casing to operate the same.

4. In a feed-water heater and purifier, the combination with a steam-chamber, of a vertical series of perforated plates in the upper part thereof, scrapers upon the plates, acting to dislodge incrustation therefrom, and a settling-chamber below the plates, having means for the discharge of the scrapings.

5. In a feed-water heater and purifier, in combination, a vertical casing having steam and water inlets at the top, sediment-collectors in the upper part thereof, through which the water flows, a settling-chamber in the lower part of the casing, spaced from the side thereof and open at the bottom, and an outlet for the water at the top of said space, whereby the water flows downwardly through the chamber and upwardly through said space, and means to dislodge sediment from the collectors into the settling-chamber, substantially as described.

6. The combination with a steam-casing having a water-inlet at the top and a series of plates over which the water flows, of a settling-chamber within the casing, under the plates, through which the water flows downwardly, a passage leading upwardly from the bottom of said chamber and having an outlet at the top, and means to dislodge sediment from the plates into the settling-chamber.

7. In a water-purifier, the combination with a casing having a water inlet and outlet at opposite ends, of a shaft extending into the casing, a spider fixed to the shaft and rotatable therewith, and a plurality of adjacent flexible metallic bodies through which the water flows, fixed to the spider and movable therewith, whereby the bodies will rub together when the shaft is rotated.

In testimony whereof I have signed my name to this specification in the presence of two subscribing witnesses.

JOHN WILHELM PERTZ.

Witnesses:
O. A. ARMFIELD,
ENOCH E. DONALDSON.